United States Patent
Qian

(10) Patent No.: US 11,122,210 B2
(45) Date of Patent: *Sep. 14, 2021

(54) INTELLIGENT OBJECT TRACKING USING OBJECT-IDENTIFYING CODE

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,383

(22) Filed: Jan. 20, 2020

(65) Prior Publication Data

US 2020/0154036 A1    May 14, 2020

Related U.S. Application Data

(63) Continuation of application No. PCT/CN2018/096166, filed on Jul. 18, 2018, and a
(Continued)

(51) Int. Cl.
*H04N 5/232* (2006.01)
*H04N 5/235* (2006.01)
(Continued)

(52) U.S. Cl.
CPC ....... *H04N 5/23299* (2018.08); *F16M 11/041* (2013.01); *F16M 11/10* (2013.01);
(Continued)

(58) Field of Classification Search
CPC ............. H04N 5/23299; H04N 5/2253; H04N 5/23218; H04N 5/232; H04N 9/045;
(Continued)

(56) References Cited

U.S. PATENT DOCUMENTS

| 5,227,985 A | 7/1993 | DeMenthon |
| 2002/0097893 A1 | 7/2002 | Lee et al. |

(Continued)

FOREIGN PATENT DOCUMENTS

| CN | 1460187 A | 12/2003 |
| CN | 101451836 A | 6/2009 |

(Continued)

OTHER PUBLICATIONS

Office Action and Search Report issued in corresponding TW Application No. 107124850 dated Feb. 25, 2019 (7 pages).
(Continued)

*Primary Examiner* — Twyler L Haskins
*Assistant Examiner* — Angel L Garces-Rivera
(74) *Attorney, Agent, or Firm* — Osha Bergman Watanabe & Burton LLP

(57) ABSTRACT

A method for object tracking. The method includes capturing a sequence of images of a scene, detecting, by a hardware processor based on a pattern of local light change across the sequence of images, a light source in the scene, comparing, by the hardware processor in response to detecting the light source, a location of the light source in at least one image of the sequence of images and a target position within the at least one image to generate a result, and generating, by the hardware processor based on the result, a control signal for changing a field-of-view of a camera device such that the light source substantially aligns with the target position within the field-of-view, wherein the light source is configured to produce an object-identifying code.

20 Claims, 10 Drawing Sheets

Related U.S. Application Data continuation-in-part of application No. 16/025,761, filed on Jul. 2, 2018.

(51) Int. Cl.

| | |
|---|---|
| *H04N 5/225* | (2006.01) |
| *G01S 1/70* | (2006.01) |
| *F16M 11/10* | (2006.01) |
| *F16M 13/00* | (2006.01) |
| *F16M 11/18* | (2006.01) |
| *F16M 11/04* | (2006.01) |
| *G01S 3/786* | (2006.01) |
| *H04N 9/04* | (2006.01) |
| *F16M 11/20* | (2006.01) |
| *G06T 7/246* | (2017.01) |
| *G06T 7/73* | (2017.01) |
| *F16M 13/04* | (2006.01) |
| *G01S 17/66* | (2006.01) |
| *G03B 17/56* | (2021.01) |
| *F16M 11/24* | (2006.01) |

(52) U.S. Cl.
CPC ......... *F16M 11/18* (2013.01); *F16M 11/2014* (2013.01); *F16M 13/00* (2013.01); *F16M 13/04* (2013.01); *G01S 1/7038* (2019.08); *G01S 3/786* (2013.01); *G01S 17/66* (2013.01); *G03B 17/561* (2013.01); *G06T 7/246* (2017.01); *G06T 7/73* (2017.01); *H04N 5/2254* (2013.01); *H04N 5/2256* (2013.01); *H04N 5/232* (2013.01); *H04N 5/2354* (2013.01); *H04N 5/23216* (2013.01); *H04N 5/23218* (2018.08); *H04N 5/23238* (2013.01); *H04N 5/23261* (2013.01); *H04N 9/045* (2013.01); *F16M 11/205* (2013.01); *F16M 11/2064* (2013.01); *F16M 11/242* (2013.01); *F16M 2200/041* (2013.01); *F16M 2200/044* (2013.01); *G06T 2207/10016* (2013.01)

(58) Field of Classification Search
CPC ............. H04N 5/23216; H04N 5/2354; H04N 5/23261; H04N 5/2256; H04N 5/23238; H04N 7/188; H04N 5/23203; G06T 7/246; G06T 7/73; G06T 2207/10016; G06T 7/254; F16M 13/04; F16M 11/10; F16M 13/00; F16M 11/18; F16M 11/041; F16M 11/2014; F16M 11/205; F16M 11/2064; F16M 2200/041; F16M 11/242; F16M 2200/044; G01S 17/66; G01S 1/7038; G01S 3/786; G03B 17/561
See application file for complete search history.

(56) References Cited

U.S. PATENT DOCUMENTS

| | | |
|---|---|---|
| 2004/0070565 A1 | 4/2004 | Nayar et al. |
| 2013/0120636 A1 | 5/2013 | Baer |
| 2014/0037135 A1 | 2/2014 | Kutliroff et al. |
| 2015/0049211 A1 | 2/2015 | Lim |
| 2018/0007331 A1 | 1/2018 | Levcovich |
| 2018/0288295 A1 | 10/2018 | Scepanovic et al. |
| 2019/0082112 A1 | 3/2019 | Qian |
| 2020/0151887 A1* | 5/2020 | Qian ................. H04N 5/23218 |

FOREIGN PATENT DOCUMENTS

| | | |
|---|---|---|
| CN | 102143324 A | 8/2011 |
| CN | 103810695 A | 5/2014 |
| CN | 105937904 A | 9/2016 |

OTHER PUBLICATIONS

Office Action issued in corresponding TW Application No. 107124850 dated Oct. 5, 2019 (4 pages).
Notice of Allowance issued in corresponding TW Application No. 107124850 with English translation dated Sep. 18, 2020 (4 pages).

* cited by examiner

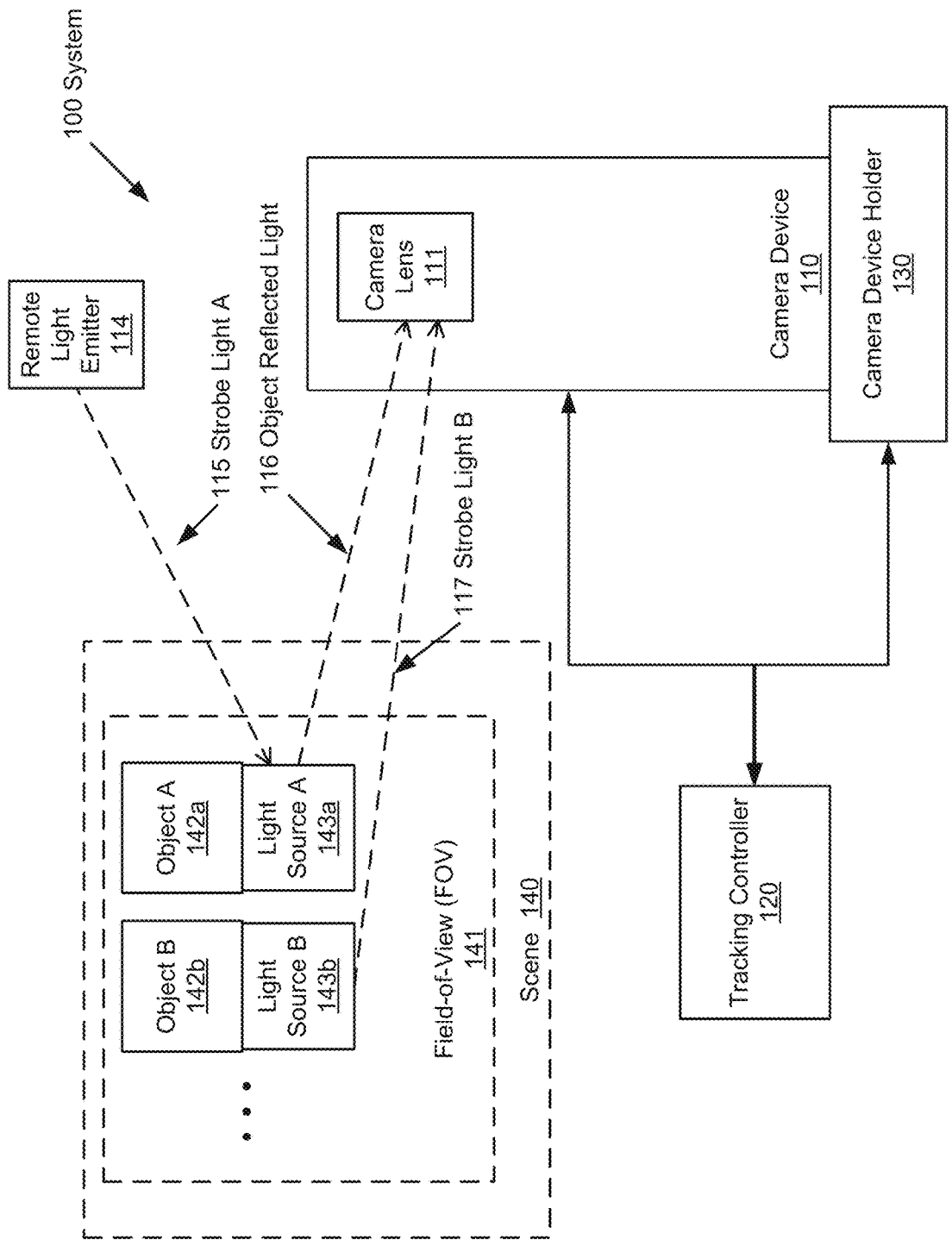
FIG. 1.1

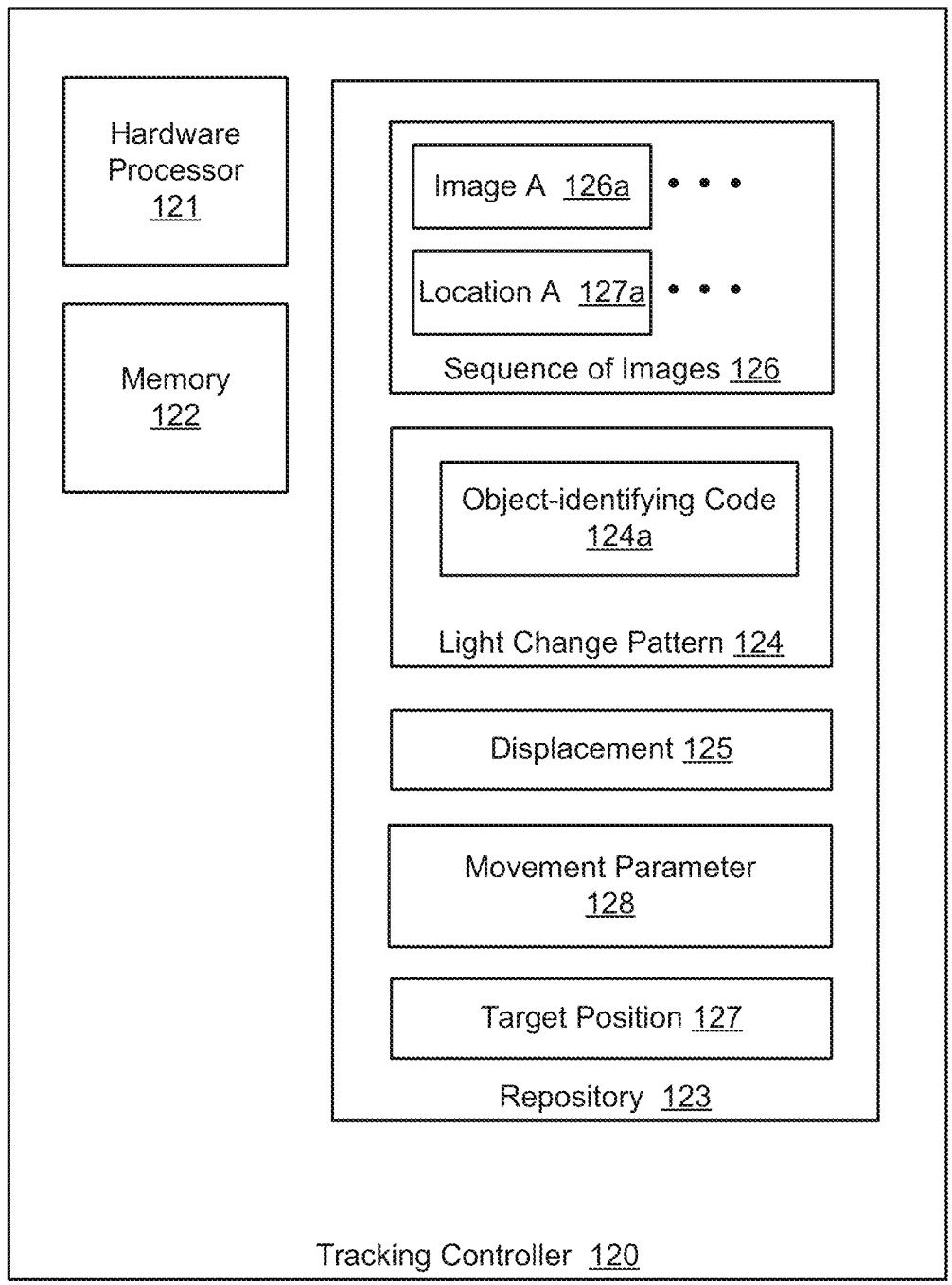
FIG. 1.2

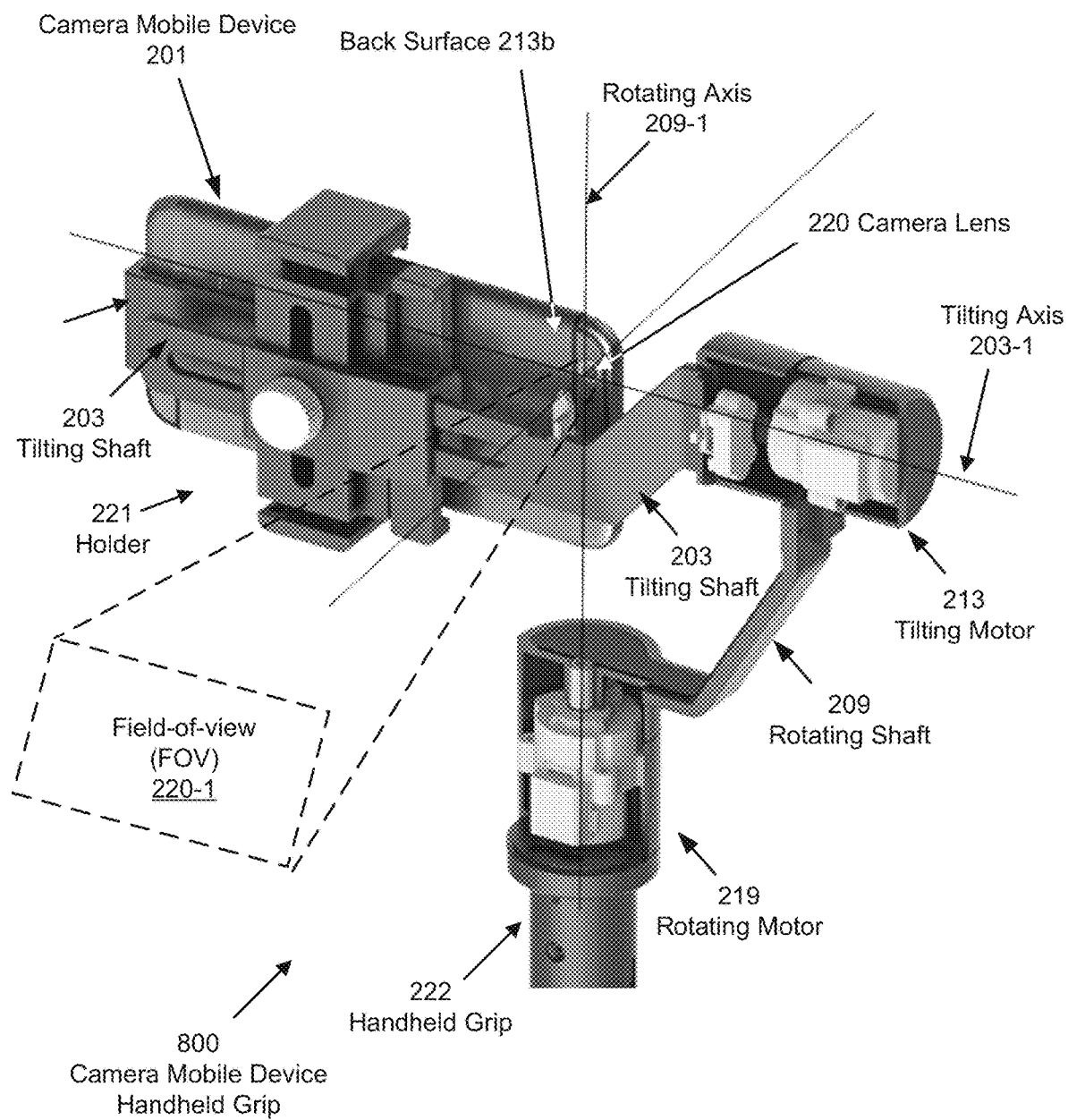
FIG. 3.1

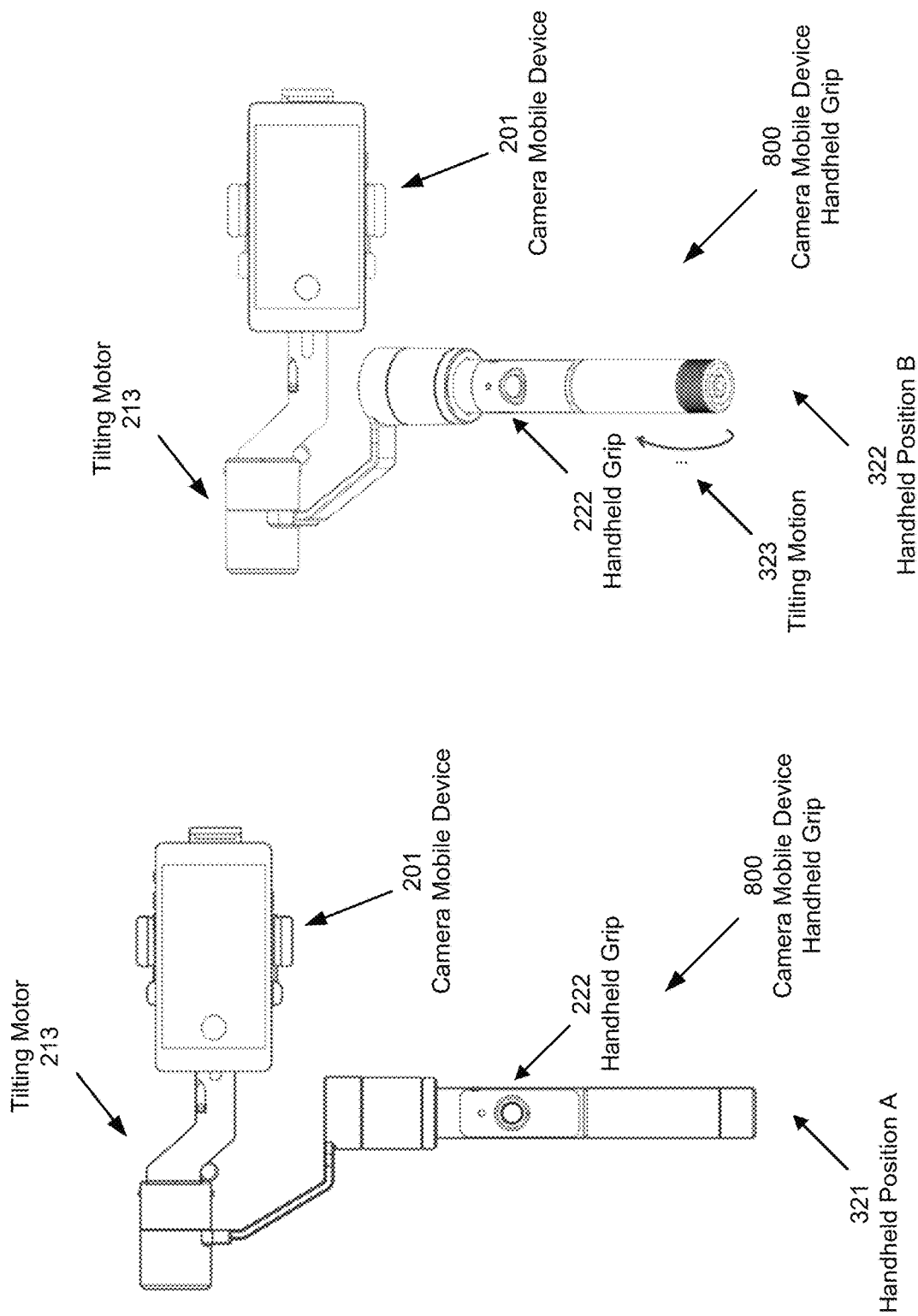
FIG. 3.2

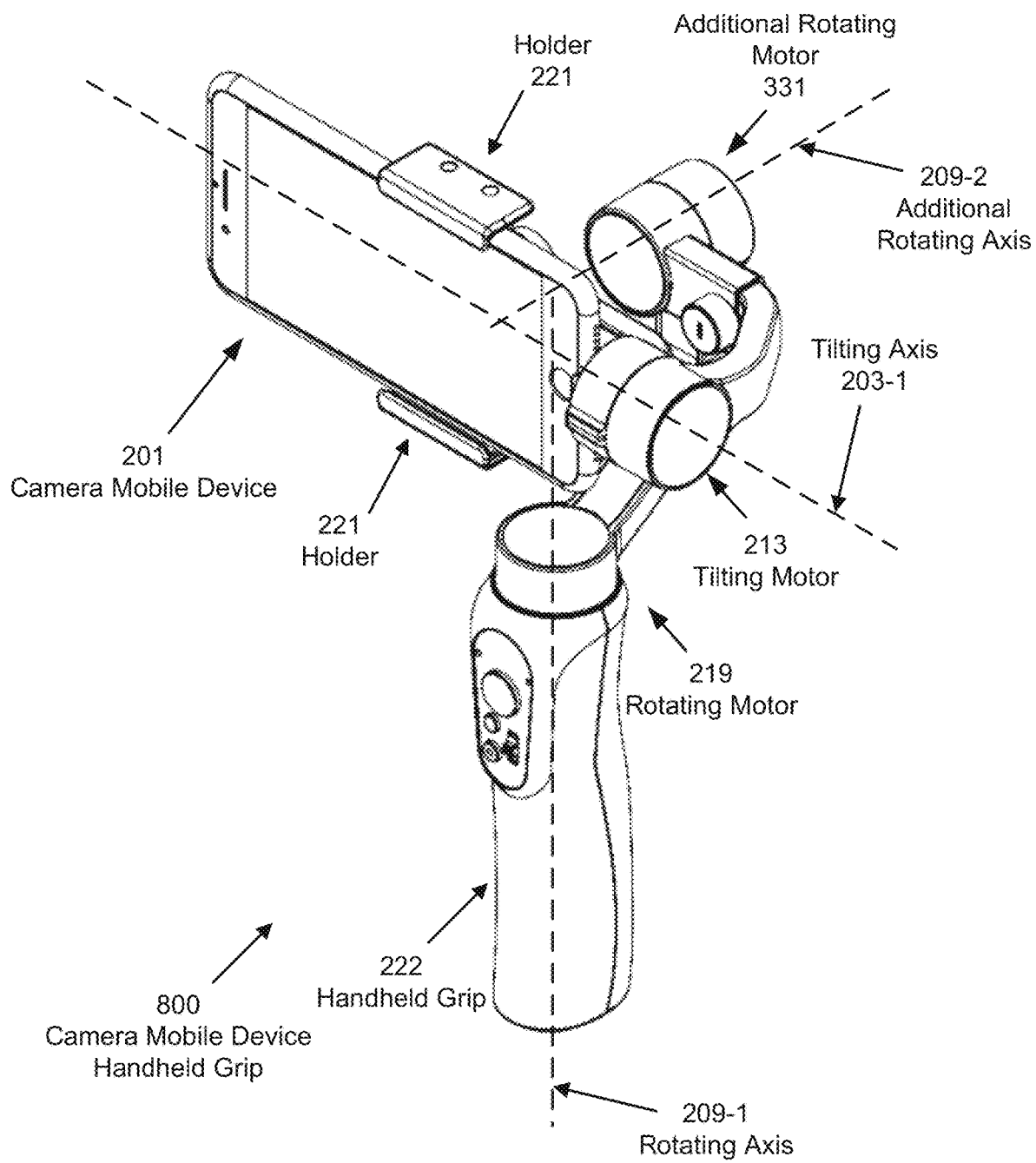
FIG. 3.3

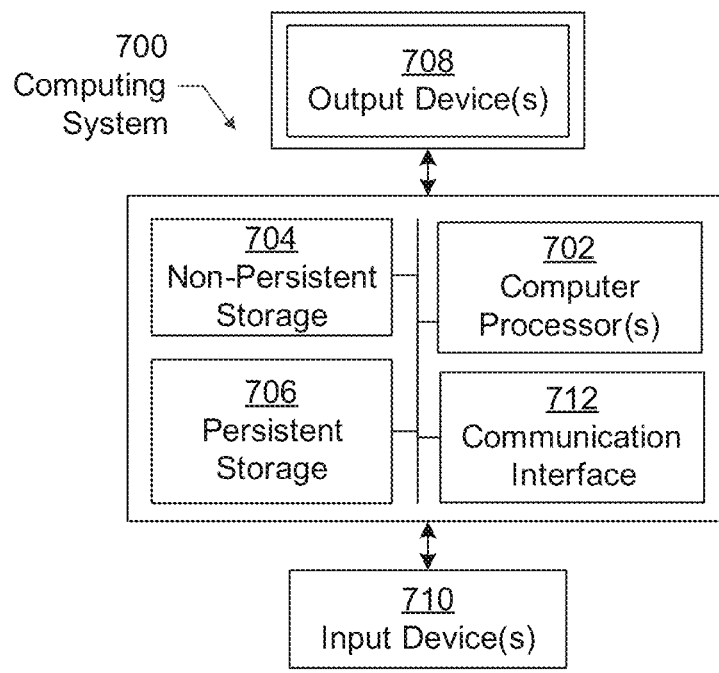
*FIG. 7.1*
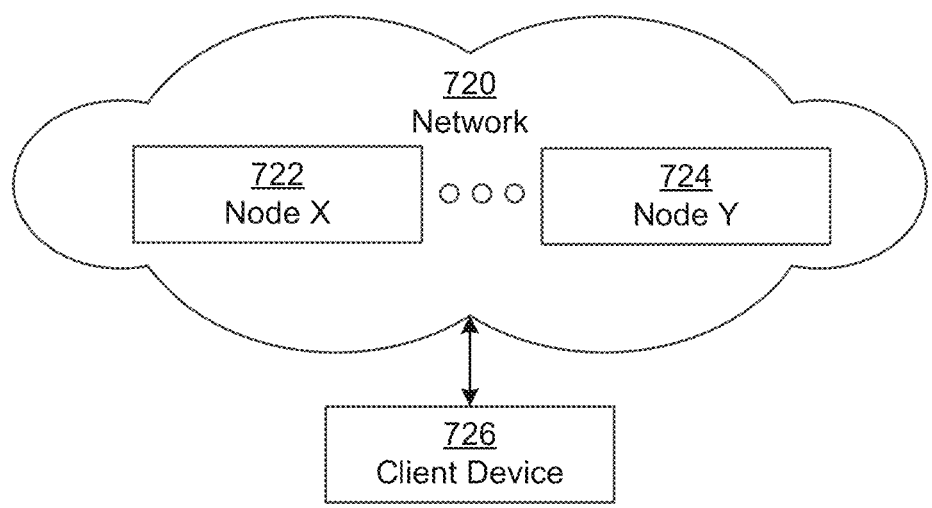
*FIG. 7.2*

US 11,122,210 B2

INTELLIGENT OBJECT TRACKING USING OBJECT-IDENTIFYING CODE

CROSS REFERENCES TO RELATED APPLICATIONS

This application is a continuation of PCT Application No. PCT/CN2018/096166, filed Jul. 18, 2018, which claims priority to PCT Application No. PCT/CN2017/093439, filed Jul. 18, 2017. The entire contents of these applications are incorporated herein by reference.

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera.

SUMMARY

In general, in one aspect, the invention relates to a method for object tracking. The method includes capturing a sequence of images of a scene, detecting, by a hardware processor based on a pattern of local light change across the sequence of images, a light source in the scene, comparing, by the hardware processor in response to detecting the light source, a location of the light source in at least one image of the sequence of images and a target position within the at least one image to generate a result, and generating, by the hardware processor based on the result, a control signal for changing a field-of-view of a camera device such that the light source substantially aligns with the target position within the field-of-view, wherein the light source is configured to produce an object-identifying code.

In general, in one aspect, the invention relates to a tracking controller for a camera device. The tracking controller includes a computer processor and memory storing instructions, when executed, causing the computer processor to capturing a sequence of images of a scene, detect, based on a pattern of local light change across the sequence of images, a light source in the scene, compare, in response to detecting the light source, a location of the light source in at least one image of the sequence of images and a target position within the at least one image to generate a result, and generate, based on the result, a control signal for changing a field-of-view of a camera device such that the light source substantially aligns with the target position within the field-of-view, wherein the light source is configured to produce an object-identifying code.

In general, in one aspect, the invention relates to a non-transitory computer readable medium storing instructions for object tracking. The instructions, when executed by a computer processor, comprising functionality for capturing a sequence of images of a scene, detecting, based on a pattern of local light change across the sequence of images, a light source in the scene, comparing, in response to detecting the light source, a location of the light source in at least one image of the sequence of images and a target position within the at least one image to generate a result, and generating, based on the result, a control signal for changing a field-of-view of a camera device such that the light source substantially aligns with the target position within the field-of-view, wherein the light source is configured to produce an object-identifying code.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

FIGS. 3.1, 3.2, 3.3, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 2:
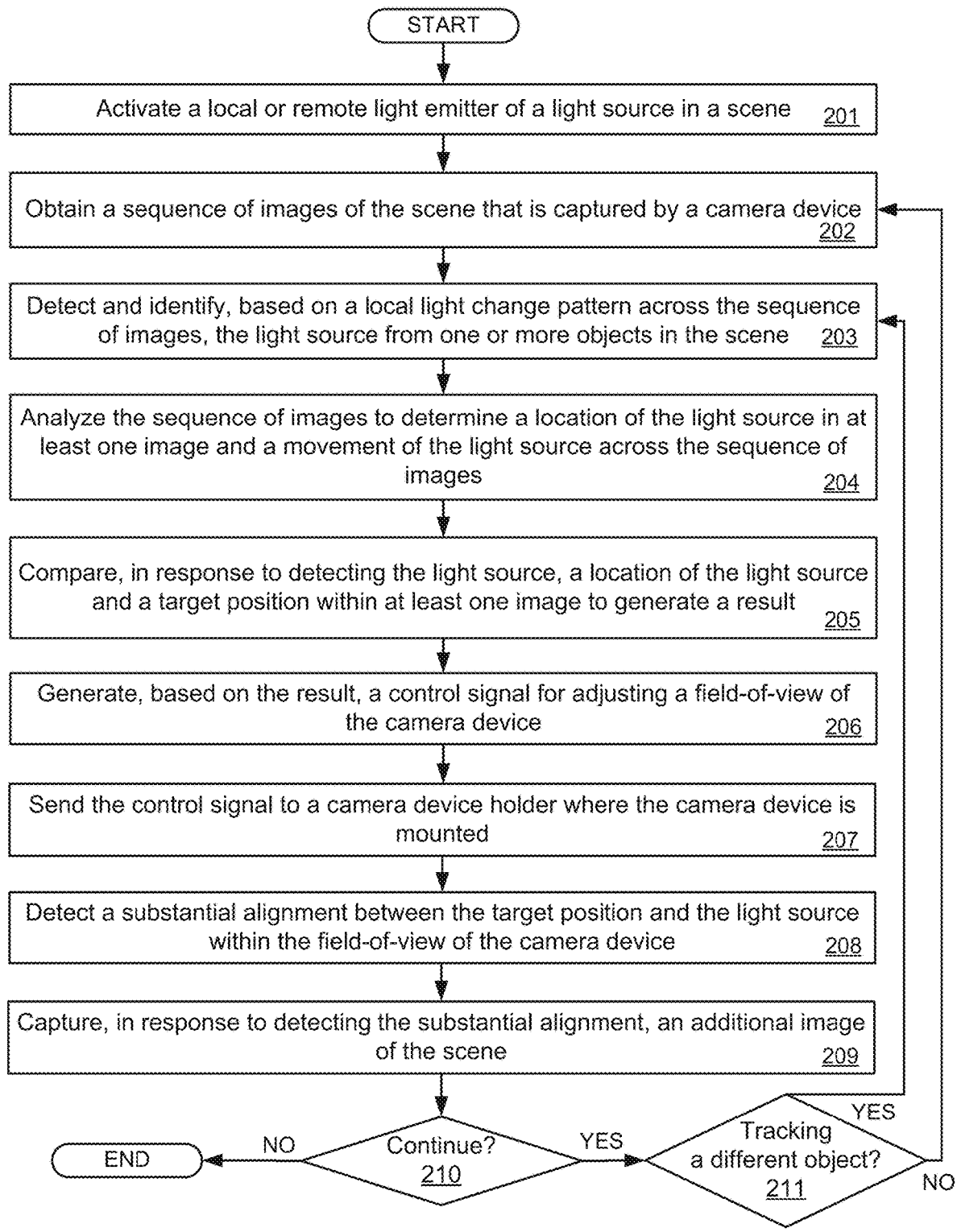
FIG. 2 shows a method flowchart in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represents a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one or more embodiments of the invention, a light source is attached to an object while a sequence of images corresponding to the FOV are captured. In one or more embodiments, the light source produces a local light change pattern across the sequence of images. Based on the local light change pattern, the light source is detected in the FOV. In response to detecting the light source, a location of the light source and a target position within an image are compared to generate a result, such as a displacement or a movement parameter. Accordingly, a control signal is generated based on the result to control a camera device holder. Specifically, the camera device holder adjusts the FOV based on the control signal such that the light source substantially aligns with the target position within the FOV. In one or more embodiments, multiple light sources are attached to multiple objects in the scene where each light source produces a distinct object-identifying code in the respective local light change pattern. Accordingly, multiple objects may be tracked concurrently. In one or more embodiments, the sequence of images is part of a video recording and the control signal causes the object to appear at the target position within the FOV in the video recording.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111), a tracking controller (120), a camera device holder (130), a scene (140), a field-of-view (FOV) (141) of the camera lens (111), object(s) (e.g., object A (142a), object B (142b)) appearing within the FOV (141), light source(s) (e.g., light source A (143a), light source B (143b)) attached to the object(s). A light source is a source of light where the light is captured by the camera device (110). For example, the light source A (143a) is shown as a reflective light source attached to the object A (141a) with a remote light emitter (114) emitting a strobe light A (115) that shines on the reflective light source A (143a) to generate an object reflected light (116). In addition, the light source B (143b) is a local light emitter attached to the object B (142b) and emitting a strobe light B (117). Accordingly, the object reflected light (116) and strobe light B (117) are captured by the camera device (110) via the camera lens (111) to contribute to one or more images. In addition, ambient light (not shown) is also a light source contributing to the image(s) captured by the camera device (110). The term "light source" may also refer to a corresponding spot produced by the light source in the captured image. Throughout this disclosure, the remote light emitter and local light emitter are referred to as light emitters, and the strobe light may be emitted by the remote light emitter or the local light emitter. Further, the camera device (110), tracking controller (120), and camera device holder (130) are communicatively coupled to each other. In one or more embodiments of the invention, two or more of the remote light emitter (114), camera device (110), tracking controller (120), and camera device holder (130) are integrated into a single device. For example, at least a portion of the tracking controller (120) may be included in the camera device (110). In another example, at least a portion of the tracking controller (120) may be included in the camera device holder (130). In still another example, one part of the tracking controller (120) is included in the camera device (110) while another part of the tracking controller (120) is included in the camera device holder (130). Similarly, the remote light emitter (114) may be integrated with the camera device (110), tracking controller (120), or camera device holder (130).

In one or more embodiments of the invention, a light emitter (e.g., the remote light emitter (114) or the local light emitter of the light source B (143b)) is any device that emits light. For example, the light emitter may emit light across a large angle (e.g., exceeding 45 degree plane angle, 1 square radian solid angle, etc.) as a flood light emitter. In another example, the light may emit a collimated light beam as a collimated light emitter. The remote light emitter (114) may be separate, e.g., by certain distance such as 1 meter or more, from the object A (142a). In one or more embodiments, the light emitter includes a light-emitting-diode (LED). In one or more embodiments, the strobe light (e.g., strobe light A (115), strobe light B (117)) changes intensity and/or wavelength from time to time. For example, the strobe light may produce a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or wavelength change in the light. In one or more embodiments, the light emitter produces a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light emitter produces a light change pattern that is synchronized with the frame rate of the camera device (110). In one or more embodiments, the light emitter emits an infrared light. In other words, the strobe light has an infrared wavelength, e.g., between 700 nanometers (nm) and 1 millimeter (mm) Throughout this disclosure, the term "infrared wavelength" refers to a wavelength between 700 nm and 1 mm. In one or more embodiments, the light change pattern produced by the strobe light represents encoded digital data. For example, the encoded digital data produced by an infrared strobe light may be similar to an infrared remote control code.

In one or more embodiments of the invention, the reflective light source A (143a) is a reflective region of the object A (142a) that reflects the strobe light A (115) to generate the object reflected light (116). In this context, the reflective light source A (143a) is said to emit the object reflected light (116). In one or more embodiments, the reflective region has a higher reflectance for infrared wavelength than for visible wavelength. For example, the higher reflectance may be based on reflective material with a higher reflectivity for infrared wavelength than for visible wavelength. While both the strobe light A (115) and ambient light (not shown) shine on the reflective region, the object reflected light (116) may have higher infrared reflected content from the strobe light A (115) than visible reflected content from ambient visible light. In one or more embodiments, the object A (142a) is a human, animal, robot, or any other moving item, and the reflective light source A (143a) includes a reflective material attached to the object A (142a). For example, the reflective material may be part of a wrist band, arm band, belt, finger ring, pendant, necklace, hat, glove, clothing, etc. worn by or otherwise attached to the human, animal, robot, or any other moving item. In one or more embodiments, the reflective material may include metal, dielectric material, or a combination of metal and dielectric material. In one or more embodiments, the reflective material may be a coating layer or painted film on the surface of the aforementioned wrist band, arm band, belt, finger ring, pendant, necklace, hat, glove, clothing, etc. For example, the coating layer or painted film may include infrared reflective pigments such as titanium dioxide. In particular, the titanium dioxide may have a reflectance exceeding 75% for the infrared wavelength.

In one or more embodiments, the reflective material includes a geometric pattern having geometrically varying reflectivity for infrared wavelength to produce a geometric light change pattern. In particular, the geometric pattern of the reflective material produces a spatial variation of the object reflected light that is captured by the camera lens as additional distinction from ambient light. In other words, the geometric pattern enhances the accuracy of detection of the reflective light source. As used herein, geometric light change pattern is a pattern of intensity change in the light according to the geometric pattern. For example, the geometric pattern may be created by surface coating/painting using the aforementioned infrared reflective pigments such as titanium dioxide. In one or more embodiments, the object reflected light (116) from the reflective light source A (143a) includes time modulation based on the aforementioned light change pattern originated from the remote light emitter (114) and/or spatial modulation based on the geometric light change pattern of the reflective light source A (143a).

In one or more embodiments of the invention, the camera device (110) is a device with a camera lens (e.g., camera lens (111)) and associated components for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface of the smart phone.

In one or more embodiments, the scene (140) is a place where an action or event, imaged by the camera device (110), occurs. In particular, the action or event may be associated with the objects (e.g., object A (142a), object B (142b)). Further, one or more objects may be stationary, moving from time to time, or constantly moving within the scene (140). The field-of-view (FOV) (141) is an extent of the scene (140) that is imaged by the camera device (110) using the camera lens (111). In other words, an object (e.g., object A (142a), object B (142b)) inside the FOV (141) will appear in an image captured and/or outputted by the camera device (110). For example, the FOV (141) may correspond to a solid angle within which the camera lens (111) projects light input to an associated optical sensor (not shown) of the camera device (110). In one or more embodiments, the FOV (141) corresponds to different portions of the scene (140) according to how the camera lens (111) is oriented toward, zoomed with respect to, or otherwise positioned relative to, the scene (140). In one or more embodiments, the object (e.g., object A (142a), object B (142b)) may move across the scene (140) during the action or event. Object tracking is the action causing the camera lens (111) to be oriented toward, zoomed with respect to, or otherwise positioned relative to the scene (140) such that the object (e.g., object A (142a), object B (142b)) is continuously within the FOV (141), or a target position within the FOV (141), during image captures. Throughout this disclosure, the terms "object tracking" and "tracking" may be used interchangeably. In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7.1 and 7.2 below.

In one or more embodiments of the invention, the camera device holder (130) is configured to mechanically hold the camera device (110) and to adjust, in response to a control signal from the tracking controller (120), the FOV (141) of the camera lens (111). For example, the camera device holder (130) may include a motorized tilt and swivel device for adjusting a camera angle of the camera lens (111). In another example, the camera device holder (130) may include a motorized horizontal and vertical sliding device for adjusting a position of the camera lens (111) relative to the scene (140). The sliding device may include a mechanical stage for holding and moving the camera device (110). Examples of the camera device holder (130) are described in reference to FIGS. 3.1, 3.2, and 3.3 below.

In one or more embodiments, the tracking controller (120) includes a hardware component, a software component, or a combination thereof that is configured to adjust the FOV (141) of the camera lens (111). For example, the tracking controller (120) may control the FOV (141) by way of controlling the camera device holder (130). In another example, the tracking controller (120) may further control the FOV (141) by way of controlling a zoom level of the camera lens (111). In one or more embodiments, the tracking controller (120) controls the FOV (141) such that the object A (142a) and/or the object B (142b) appear(s) in a target position within the FOV (141). In one or more embodiments, the tracking controller (120) controls the FOV (141) using the method described in reference to FIG. 2 below. In one or more embodiments, the tracking controller (120) includes the components described in reference to FIG. 1.2 below.

Although the light sources shown in FIG. 1.1 include both a local light emitter and a reflective light source, other configurations may also be possible where only local light emitters or only reflective light sources are used. For example, both light source A (143a) and light source B (143b) may be local light emitters. In another example, both light source A (143a) and light source B (143b) may be reflective light sources shone by a single remote light emitter (114).

Although the system (100) shown in FIG. 1.1 includes only one camera device and camera device holder, multiple camera devices and multiple camera device holders may be possible. For example, multiple camera devices may be configured to track different objects with different encoded light sources simultaneously without conflict.

FIG. 1.2 shows details of the tracking controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the tracking controller (120) includes a hardware processor (121), memory (122), and repository (123). In one or more embodiments of the invention, the hardware processor (121) corresponds to the computer processors (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform FOV adjustment functionalities of the camera device (110) depicted in FIG. 1.1 above. In one or more embodiments, the tracking controller (120) performs the FOV adjustment functionalities according to the method flowchart described in reference to FIG. 2 below. In one or more embodiments, the memory (122) stores instructions to perform one or more portions of the method flowchart described in reference to FIG. 2 below. In one or more embodiments, the tracking controller (120) and the camera device (110) are integrated into a single device. In such embodiments, the instructions to perform one or more portions of the method flowchart described in reference to FIG. 2 are part of a mobile application, or mobile app, which is a user-installable software application designed to run on a smart phone or other mobile devices.

Further as shown in FIG. 1.2, the repository (123) includes a sequence of images (126), a light change pattern (124), a displacement (125), a movement parameter (128), and a target position (127). In particular, the sequence of images (126) includes consecutive images (e.g., image A (126a)) captured by the camera device (111). For example, the image A (126a) corresponds to a portion of the scene (140) that is covered by the FOV (141) at a particular time point. The light change pattern (124) is a pattern of light intensity and/or wavelength alternating between different intensity levels and/or wavelengths across the sequence of images (126).

In one or more embodiments, the light change pattern (124) corresponds to a spot in each image of the sequence of images (126). For example, the spot may be defined by a pixel position or a collection of connected pixel positions in each image. In this context, the light change pattern (124) is referred to as a local light change pattern captured by the camera device (111). In one or more embodiments, the light change pattern (124) is caused by a strobe light (e.g., strobe light A (115), strobe light B (117)) and indicates a location of the light source (e.g., light source A (143a), light source B (143b)) within each image. In other words, the location of the light source (e.g., light source A (143a), light source B (143b)) within each image may be determined based on where the light change pattern (124) is found across the sequence of images (126). For example, the light change pattern (124) indicates that the light source is at the location A (127a) in the image A (126a). Similarly, each other image in the sequence of images (126) is associated with a location of the light source. The target position (127) is a pre-determined position that the tracking controller (120) is configured for tracking the object (e.g., object A (142a), object B (142b)). For example, the target position (127) may be defined as the center of the FOV (141), which corresponds to the center of each image of the sequence of images (126). In other words, the tracking controller (120) is configured to adjust the FOV (141) such that the tracked object appears at the center (i.e., target position (127)) in the image after the adjustment. In other examples, the target position (127) may be defined as different positions from the center of the FOV (141). The displacement (125) is the distance between the target position (127) and the location (e.g., location A (127a)) of the light source within an image. In one or more embodiments, the displacement (125) includes a horizontal direction distance and a vertical distance. The displacement (125) may be represented based on a number of pixels or any other suitable distance scale. In one or more embodiments, the object may be a moving object such that the location (e.g., location A (127a)) of the light source may vary from one image to next in the sequence of images (126). In such embodiments, the movement parameter (128) is a rate of change of the location (e.g., location A (127a)) of the light source over time. For example, the movement parameter (128) may include a change in the location (e.g., location A (127a)) of the light source from one image to next in the sequence of images (126). Depending on the moving direction of the tracked object, the movement parameter (128) may include a horizontal portion and a vertical portion. Mathematically, the movement parameter (128) corresponds to a derivative of the displacement (125) over time.

In one or more embodiments, light change pattern (124) includes a light intensity change and/or a light wavelength change. In particular, the light intensity change and/or light wavelength change is associated with a repetition rate of the change. In one or more embodiments, the light intensity change and/or light wavelength change with associated repetition rate defines a digital code. For example, the digital code may include a header and subsequent digital pattern where the header and subsequent digital pattern may be re-occurring within the light change pattern (124). The digital code may be distinct for each light source in the scene (140) and used for identifying the object attached with the light source. In this context, the digital code defined by the light intensity change and/or light wavelength change with associated repetition rate of the light change pattern (124) is referred to as an object-identifying code (124a). In one or more embodiments, the light intensity change and/or a light wavelength change are temporal change produced by the light emitter. In one or more embodiments, the light intensity change and/or a light wavelength change further include spatial change produced by the aforementioned geometric pattern of a reflective light source.

In one or more embodiments, the tracking controller (120) performs the FOV adjustment functionalities based on the sequence of images (126), light change pattern (124), displacement (125), movement parameter (128), and target position (127) described above. Specifically, the tracking controller (120) performs the FOV adjustment functionalities using the method described in reference to FIG. 2 below. An example of the sequence of images (126), light change pattern (124), object-identifying code (124a), displacement (125), and movement parameter (128) is described in reference to FIGS. 4-6 below.

FIG. 2 shows a flowchart in accordance with one or more embodiments. The process shown in FIG. 2 may be executed, for example, by one or more components discussed above in reference to FIGS. 1.1 and 1.2. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, in Step 201, a light source within a scene is activated. In one or more embodiments of the invention, the light source is a reflective region attached to an object in the scene. In such embodiments, the reflective light source is activated by using a remote light emitter to emit and project a strobe light onto the reflective region. For example, the strobe light is emitted with a free-running light pattern when the remote light emitter is turned on. As a result, the strobe light is reflected by the reflective region to generate an object reflected light having the same free-running light pattern. In one or more embodiments of the invention, the light source is a local light emitter attached to an object in the scene. In such embodiments, the light source is activated by activating the local light emitter to emit a strobe light. For example, the strobe light is emitted with a free-running light pattern when the local light emitter is turned on.

In one or more embodiments, the strobe light and the object reflected light have a low repetition rate (e.g., 10 hertz, 20 hertz, etc.) comparing to a frame rate of a camera device. In one or more embodiments, the strobe light and the object reflected light are synchronized with the frame rate of the camera device. For example, the strobe light may be initiated and/or synchronized based on a trigger signal sent from a tracking controller and/or the camera device. In one or more embodiments, intensity and/or wavelength of the strobe light and/or the object reflected light are changed with associated repetition rate(s) to define the object-identifying code.

In Step 202, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the object reflected light or strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating wavelengths from the light emitter. For example, the remote or local light emitter may be free running and the frame rate is selected based on the duty cycle and/or repetition rate of the free running light source. In one or more embodiments, the duty cycle and/or repetition rate of the light emitter is selected based on the frame rate of the sequence of images such that consecutive images (or a pair of images with a particular separation in the sequence) include alternating bright level and dark level, and/or alternating wavelengths from the light emitter. For example, the frame rate may be pre-determined and the light emitter is synchronized to the frame rate, e.g., based on a trigger signal from the camera device.

In Step 203, based on a local light change pattern across the sequence of images, the light source is detected in the scene. Specifically, the objected reflected light or strobe light from the light source causes changes in light intensity and/or wavelength received by an optical sensor of the camera device resulting in the local light change pattern across the sequence of images. In one or more embodiments, the intensity of the light source is adjusted to control the size of the location where the local light change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating wavelengths, in consecutive images, as recognized by the optical sensor of the camera device, exceeds a pre-determined threshold. In one or more embodiments, the location is referred to as the location of the light source in the image.

In one or more embodiments, a pair of images in the sequence of images are compared by subtraction of intensity and/or wavelength values of corresponding pixels. Specifically, the intensity and/or wavelength values are generated by the optical sensor. For example, the intensity values may correspond to pixel output values of a monochrome CMOS (complementary metal oxide semiconductor) sensor. In another example, output values of RGB CMOS sensor may be analyzed to determine the wavelength value of each pixel. In particular, the intensity and/or wavelength value of a pixel in one image is subtracted from the intensity and/or wavelength value of the corresponding pixel in another image to generate a subtraction result. The pixel where the difference in alternating bright level and dark level, and/or alternating wavelengths, is found in the subtraction result is selected as part of the location of the light source in the image. Depending on the duty cycle/repetition rate of the light source versus the frame rate of the sequence of images, the pair of images may be consecutive images or two images separated by a particular number of images, such as every three images, etc.

In one or more embodiments, an object-identifying code is extracted from the local light change pattern to identify the light source from multiple light sources within the scene. In one or more embodiments, the local light change pattern is analyzed to detect a pre-determined header pattern. Once detected, the pattern following the pre-determined header pattern is extracted as the distinct code identifying a particular light source or object. In one or more embodiments, the distinct code has a pre-determined length or number of digital bits that is used to de-limit the object-identifying code. In other embodiments, the object-identifying code may be de-limited based on other criteria.

In one or more embodiments, multiple objects within the scene are tracked concurrently where each object is attached with an individual light source with distinct object-identifying code. In other words, multiple light change patterns are found at multiple locations across the sequence of images where each light change pattern includes a distinct object-identifying code that is different from any object-identifying code of other light change pattern. Accordingly, each light source is identified as distinct from other light sources based on respective light change patterns. Because each light source is uniquely associated with the object it is attached, each object is tracked individually across the sequence of images based on respective object-identifying code.

In one or more embodiments, multiple light sources are detected and identified by iterating Steps 202 through 204. For example, each iteration may be based on a particular object-identifying code specified by a user input. In one or more embodiments, an image from the sequence of images is presented to a user interface window where a user may select an object by clicking or otherwise selecting one of multiple detected light sources. Once selected, the object-identifying code of the selected light source is used to determine the location of the selected light source corresponding to the selected object. Accordingly, the selected object is tracked for continuing image capturing in Steps 205 through 209. From time to time, the user may select a different object using the user interface, once the tracked object is switched to a different object, a different object-identifying code of the newly selected light source is used to determine the location of the newly selected light source corresponding to the newly selected object. Accordingly, the newly selected object is tracked for continuing image capturing in Steps 205 through 209.

In Step 204, the sequence of images is analyzed to determine a location of the detected and identified light source in at least one image and a movement of the light source across the sequence of images. In one or more embodiments, the location of the light source is determined based on where the difference in alternating bright level and dark level, and/or alternating wavelengths in the sequence of images, as recognized by the optical sensor of the camera device, exceeds the pre-determined threshold. In one or more embodiments, the movement of the light source is determined based on a rate of change of the location over the sequence of images.

In Step 205, in response to detecting and identifying the light source, the location of the light source and a target position within at least one image are compared to generate a result. In one or more embodiments, the result includes the displacement between the location and the target position. In one or more embodiments, the displacement may vary from one image to next in the sequence of images, indicating that the object is a moving object. In such embodiments, the rate of change of the displacement over time, e.g., from one image to next, is computed as a movement parameter.

In Step 206, a control signal is generated based on the result for orienting the camera device. In one or more embodiments, the control signal is configured to adjust the orientation of the camera lens in the opposite direction to the displacement. In one or more embodiments, the control signal is configured to adjust the relative position of the camera with respect to the scene in the opposite direction to the displacement. In one or more embodiments, the movement parameter is considered in fine tuning the amount of adjustment caused by the control signal.

In Step 207, the control signal is sent to a camera device holder (e.g., a camera handheld grip, a tilt-and-swivel device, etc.) where the camera device is mounted. Accordingly, the orientation of the camera lens or a relative position of the camera device is adjusted in the opposite direction to the displacement.

In Step 208, a substantial alignment between the target position and the light source is detected within the FOV of the camera device. In particular, the substantial alignment is a result of adjusting the orientation of the camera lens or a relative position of the camera device in the opposite direction to the displacement.

In Step 209, in response to detecting the substantial alignment, an additional image of the scene is captured. In one or more embodiments, consecutive images are continuously captured and outputted by the camera device at a regular repetition rate (i.e., frame rate). In such embodiments, the sequence of images that is analyzed to generate the control signal is limited to a rolling time window (e.g., a rolling sequence of 2 consecutive images, 5 consecutive images, 10 consecutive images, etc.) that precedes the additional image. As time passes, the additional image becomes part of an updated sequence of images for generating an updated control signal to continuously track the object in the FOV.

In one or more embodiments, the sequence of images that is analyzed to generate the control signal is designated as control information without being outputted by the camera device. In contrast, the additional image where the light source (hence the object) substantially aligns with the target position is outputted by the camera device. For example, the control information may be stored separately from the additional image until being discarded or otherwise removed from the camera device.

In Step 210, a determination is made as to whether image capturing is to continue. If the determination is positive, i.e., the image capturing is to continue, the method proceeds to Step 211. If the determination is negative, i.e., the image capturing is not to continue, the method ends.

In Step 211, a determination is made as to whether image capturing is to continue by tracking the same object or by tracking a different object. As noted above, the determination in Step 211 may be based on a user input received during the iteration of Steps 202 through 209 leading to Step 211. If the determination indicates to continue the image capturing by tracking the same object, the method returns to Step 202. If the determination indicates to continue the image capturing by tracking a different object, the method returns to Step 203.

FIGS. 3.1, 3.2, 3.3, 4, 5, and 6 show various examples in accordance with one or more embodiments of the invention. The examples shown in FIGS. 3.1, 3.2, 3.3, 4, 5, and 6 may be, for example, based on one or more components depicted in FIGS. 1.1 and 1.2 above and the method flowchart depicted in FIG. 2.1 above. In one or more embodiments, one or more of the modules and elements shown in FIGS. 3.1, 3.2, 3.3, 4, 5, and 6 may be omitted, repeated, and/or substituted. Accordingly, embodiments of the invention should not be considered limited to the specific arrangements of modules shown in FIGS. 3.1, 3.2, 3.3, 4, 5, and 6.

FIG. 3.1 shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the tracking controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the tracking controller (120) via the communication interface. Similarly, the tilting shaft (203) is rotatable by the tilting motor (213) around a tilting axis (203-1) in response to the control signal received from the tracking controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220). Although the example shown in FIG. 3.1 is based on two motors associated with two mechanical shafts, other examples may be based on three motors associated with three mechanical shafts without departing from the scope of the invention wherein the third motor may be an additional rotating motor, such as the additional rotating motor (331) with the additional rotating axis (209-2) shown in FIG. 3.3. Specifically, FIG. 3.3 shows a camera mobile device handheld grip (800) with three motors as an example of the camera device holder (130) depicted in FIG. 1.1 above.

FIG. 3.2 shows an example of stabilizing the camera mobile device handheld grip (800) depicted in FIG. 3.1 above. For example, the orientation of the camera mobile device (201) is stabilized when the camera mobile device handheld grip (800) is changed from the handheld position A (321) to the handheld position B (322) or changed from the handheld position B (322) to the handheld position A (321). As shown in FIG. 3.2, the handheld position A (321) corresponds to a vertical orientation (i.e., along the earth gravity direction) of the handheld grip (222). In the handheld position A (321), the tilting motor (213) maintains the camera mobile device (201) pointing toward the earth horizon (i.e., orthogonal to the earth gravity direction). In other words, the imaging plane of the camera mobile device (201) is orthogonal to the earth horizon.

The handheld position B (322) corresponds to a tilted orientation (i.e., deviating from the earth gravity direction) of the handheld grip (222). For example, the tilting motion (323) of the handheld grip (222) is exerted by the user's hand. In the handheld position B (322), the tilting motor (213) maintains the camera mobile device (201) pointing toward the earth horizon as in the handheld position A (321).

Figure 4:
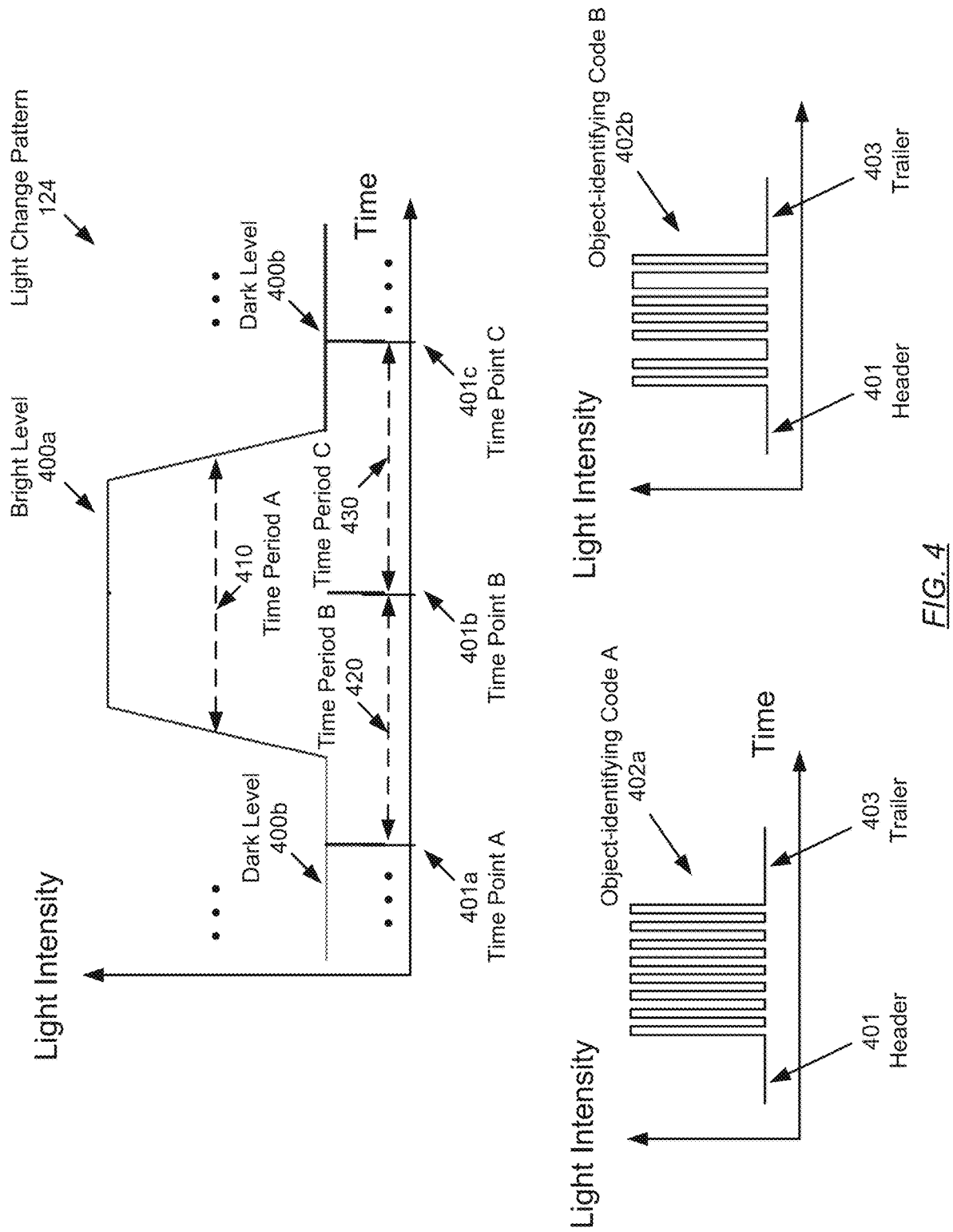

FIG. 4 shows an example of the light change pattern (124) of the light source (e.g., light source A (143a), light source B (143b)) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a bright level (400a) and a dark level (400b) over time. For example, the bright level (400a) of the light intensity sustains over a time period A (410) and may be recurring over time with certain repetition rate. While the light intensity alternates between the bright level (400a) and the dark level (400b) over time, a sequence of images is captured by a camera device periodically. For example, consecutive images in the sequence may be captured at a time point A (401a), time point B (401b), time point C (401c), etc. that are separate from each other by a time period B (420), time period C (430), etc. In particular, the time period A (410) encompasses at least one image capture time point, such as the time point B (401b). The alternating sequence of dark level (400b) captured at time point A (401a), bright level (400a) captured at time point B (401b), dark level (400b) captured at time point C (401c), etc. forms the aforementioned local light change pattern captured by the camera device. Although the light change pattern (124) depicted in FIG. 4 is a pattern of light intensity changes, the light change pattern (124) may also include wavelength changes in other examples. In other words, the bright level (400a) and dark level (400b) may be substituted or supplemented by different wavelengths to represent wavelength changes.

The light change pattern (124) depicted in FIG. 4 may be extended along the time axis across a sequence of time points and images to define an object-identifying code. For example, the object-identifying code A (402a) and object-identifying code B (402b) are shown in FIG. 4 below the light change pattern (124) using a different time scale. In one or more embodiments, the light intensity level and/or wavelength value in each image defines a digital data bit. In other embodiments, the light intensity level and/or wavelength value is constant across each of a number of recurring sets of images where each image set corresponds to a digital data bit. In other words, a digital data bit may correspond to a single image or an image set. In each of the object-identifying code A (402a) and object-identifying code B (402b), a distinct digital data bit pattern is delimited by a header (401) and a trailer (403). For example, the header (401) and trailer (403) may each contain 8 consecutive "zero" digital data bits. Inserted between the header (401) and trailer (403), the object-identifying code A (402a) includes a digital data bit pattern of "1010101010101010" while the object-identifying code B (402b) includes a digital data bit pattern of "1010010101011010". Accordingly, the digital data bit pattern of "1010101010101010" and the digital data bit pattern of "1010010101011010" are used to identify or select two distinct light sources attached to two distinct objects within the scene (140) depicted in FIGS. 1.1 and 1.2 above.

Figure 5:
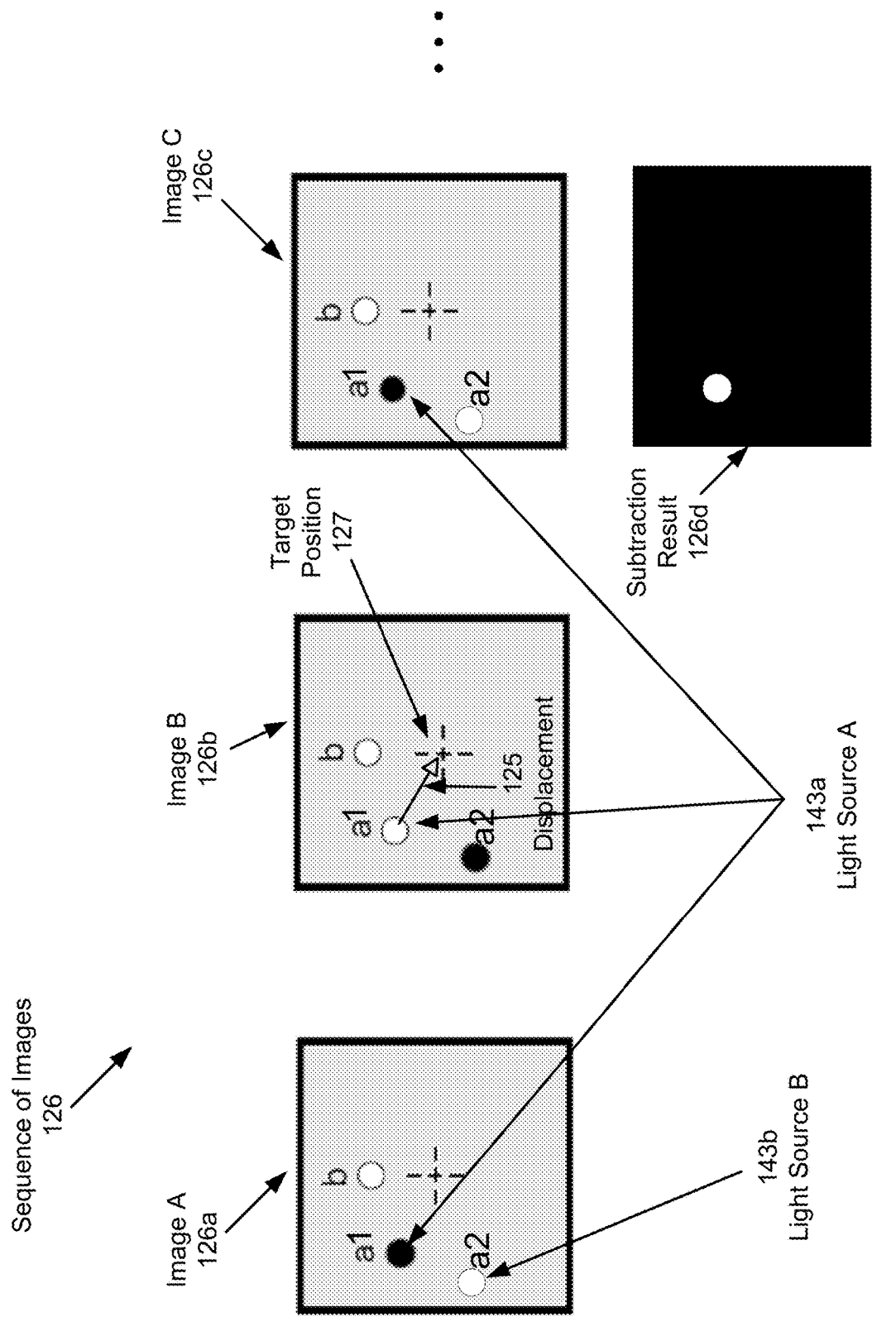

FIG. 5 shows an example of the sequence of images (126) of the scene (140) depicted in FIGS. 1.1 and 1.2 above. As shown in FIG. 5, the sequence of images (126) includes the image A (126a), image B (126b), image C (126c), etc. that are captured at the time point A (401a), time point B (401b), time point C (401c), etc. depicted in FIG. 4 above. According to the example of the light change pattern (124) described in reference to FIG. 4 above, the light source (e.g., light source A (143a), light source B (143b)) appears as an alternating dark and bright spot at a location marked "a1" or a location marked "a2" in the image A (126a), image B (126b), image C (126c), etc. In contrast, the light intensity remains substantially constant at another location marked "b" in the image A (126a), image B (126b), image C (126c), etc. For example, the location marked "a1" may be determined by subtracting intensity values of corresponding pixels in the image A (126a) and image B (126b) to generate the subtraction result (126d). Similarly, the location marked "a1" may be further determined by subtracting intensity values of corresponding pixels in the image B (126b) and image C (126c) to generate the subtraction result (126d). In the subtraction result (126d), black color indicates no difference and white color indicates a non-zero difference or a difference exceeding the aforementioned pre-determined threshold. Accordingly, the location of the light source (e.g., light source A (143a)) corresponds to the white spot in the subtraction result (126d). In another example, the location marked "a2" may be determined in a similar manner to detect the location of a different light source (e.g., light source B (143b)) within the images.

Further as shown in FIG. 5, the center of each image is defined as the target position (127). Accordingly, the distance from the location marked "a1" to the target position (127) corresponds to the displacement (125). The location marked "a1", the target position (127), and the displacement (125) shown in FIG. 5 are examples of the location A (127a), target position (127), and displacement (125), respectively, depicted in FIG. 1.2 above. In one or more embodiments, the location marked "a1" varies between the image A (126a), image B (126b), image C (126c), etc. The rate of change of the location marked "a1" across image A (126a), image B (126b), image C (126c), etc. corresponds to the movement parameter (128) depicted in FIG. 1.2 above. Although not explicitly shown, the displacement (125) and/or movement parameter (128) may also correspond to the location marked "a2" in a different example.

Figure 6:
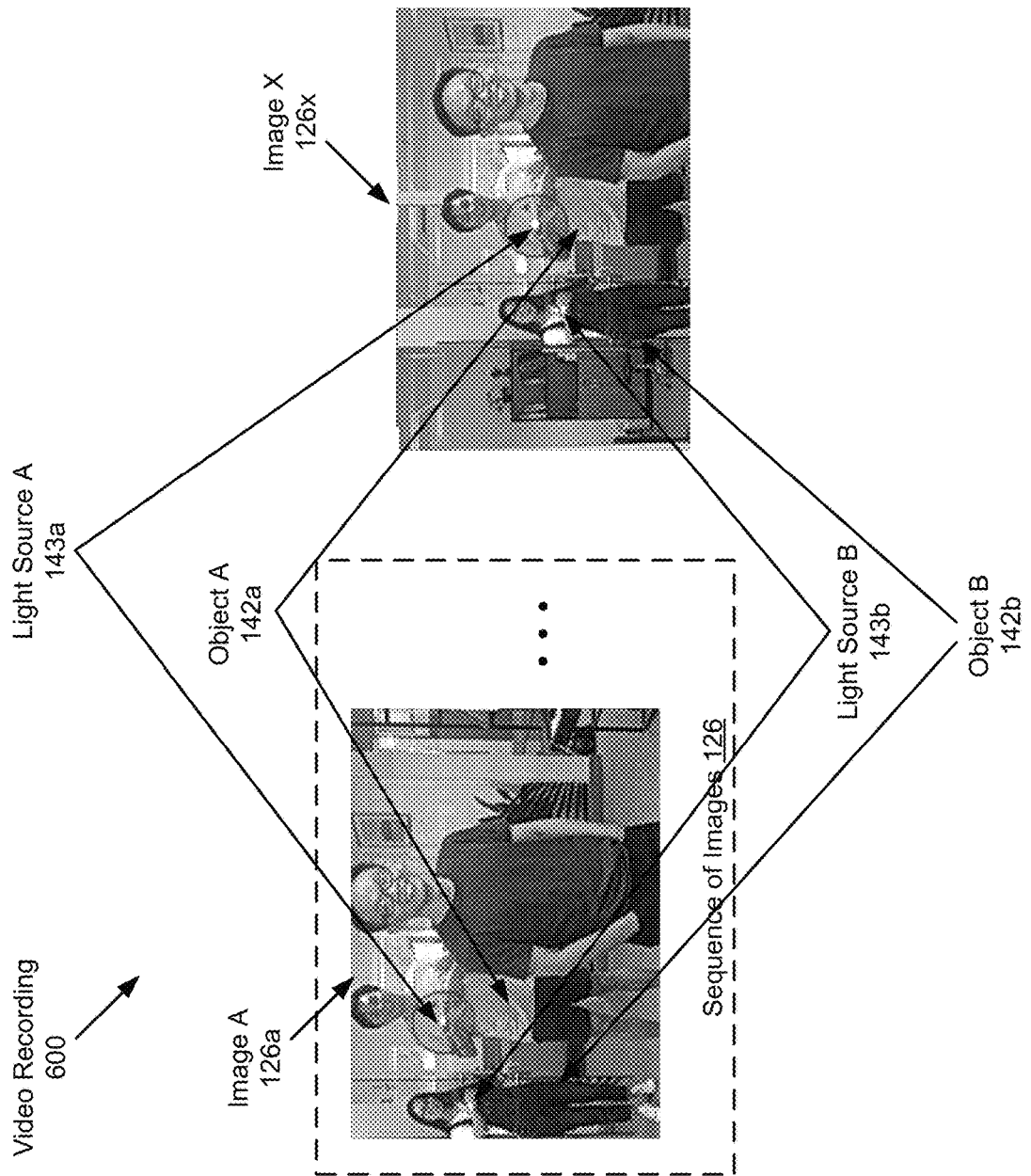

FIG. 6 shows an example video recording (600) that includes the example of the sequence of images (126) described in reference to FIG. 4 above. In an example scenario, the target position is the center of the image. As shown in FIG. 6, when the object-identifying code A (402a) depicted in FIG. 4 above is used for object tracking, the light source A (143a) is identified at a location in the left portion of the images (e.g., image A (126a)) in the sequence of images (126). In particular, the light source A (143a) is reflective material included in a finger ring or part of a wrist band worn by a male person (i.e., object A (142a)). For example, the location of the light source A (143a) is identified based on the alternating dark and bright spot "a1" in the image A (126*a*), image B (126*b*), image C (126*c*), etc. depicted in FIG. 5 above. In particular, the alternating dark and bright spot "a1" in the image A (126*a*), image B (126*b*), image C (126*c*), etc. exhibits temporal and/or spatial variation that defines the object-identifying code A (402*a*) associated with the light source A (143*a*). Because the target position (i.e., image center) is to the right of the light source location, the tracking controller (120) is configured to orient the camera device (110) toward the left such that the male person (i.e., object A (142*a*)) holding/wearing the light source A (143*a*) appears in the center of the image. Accordingly, using the object-identifying code A (402*a*), the orientation of the camera device (110) is adjusted based on the identified location "a1" of the light source A (143*a*) such that the object A (142*a*) appears in the center of the image X (126*x*).

Further as shown in FIG. 6, when the object-identifying code B (402*b*) depicted in FIG. 4 above is used for object tracking, the light source B (143*b*) is identified at a location in the left portion of the images (e.g., image A (126*a*)) in the sequence of images (126). In particular, the light source B (143*b*) is a finger ring or part of a wrist band worn by a female person (i.e., object B (142*b*)). For example, the location of the light source B (143*b*) is identified based on the alternating dark and bright spot "a2" in the image A (126*a*), image B (126*b*), image C (126*c*), etc. depicted in FIG. 5 above. In particular, the alternating dark and bright spot "a2" in the image A (126*a*), image B (126*b*), image C (126*c*), etc. exhibits temporal and/or spatial variation that defines the object-identifying code B (402*b*) associated with the light source B (143*b*). Because the target position (i.e., image center) is to the right of the light source location, the tracking controller (120) is configured to orient the camera device (110) toward the left such that the female person (i.e., object B (142*b*)) holding/wearing the light source B (143*b*) appears in the center of the image. Accordingly, using the object-identifying code B (402*b*), the orientation of the camera device (110) is adjusted based on the identified location "a2" of the light source B (143*b*) such that the object B (142*b*) appears in the center of the image X (126*x*). By attaching different light sources having distinct object-identifying codes to multiple objects in the scene, object tracking may be switched expediently between different objects in the scene. For example, video recording may continue without disruption while switching the tracked object from the male person to the female person as described above.

To improve accuracy of object tracking, in addition to detecting the location of the reflective light source (143) based on the alternating dark and bright spot in the image A (126*a*), image B (126*b*), image C (126*c*), etc. depicted in FIG. 5 above, the geometric shape of the alternating dark and bright spot is qualified based on matching the geometric shape of the reflective material included in a finger ring or part of a wrist band worn by a male person (i.e., object A (142*a*)). In other words, any alternating dark and bright spot in the image A (126*a*), image B (126*b*), image C (126*c*), etc. that does not match the geometric shape of the reflective pattern is excluded in identifying the reflective light source (143).

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for object tracking, comprising:
capturing, using a single optical sensor of a camera device, a sequence of images of a scene;
detecting, based on a pattern of local light change across the sequence of images captured by the single optical sensor, a light source in the scene;
comparing, in response to detecting the light source, a location of the light source in at least one image of the sequence of images and a target position within the at least one image to generate a result; and
generating, based on the result, a control signal for changing a field-of-view of the camera device such that the light source aligns with the target position within the field-of-view,
wherein the light source is configured to produce an object-identifying code,
wherein the pattern of local light change identifies at least a first pixel position in the at least one image as the location of the light source,
wherein the target position corresponds to at least a second pixel position in the at least one image, and
wherein the result comprises a pixel position displacement between at least the first pixel position of the light source and at least the second pixel position of the target position.

2. The method of claim 1,
wherein the light source is at least one selected from a group consisting of a local light emitter attached to an object in the scene and a reflective region of the object emitting an object-reflected light in response to a remote light emitter separate from the object, and
wherein the pattern of local light change across the sequence of images is produced by at least one selected from a group consisting of the local light emitter, the remote light emitter, and a geometric reflection pattern of the reflective region.

3. The method of claim 1,
wherein the pattern of local light change comprises at least one selected from a group consisting of a light intensity change, a light wavelength change, a repetition rate of the light intensity change, and a repetition rate of the light wavelength change.

4. The method of claim 1, further comprising:
extracting the object-identifying code from the pattern of local light change; and
identifying, from a plurality of light sources associated with a plurality of objects in the scene, the detected light source based on the extracted object-identifying code to select the object from the plurality of objects.

5. The method of claim 4,
sending the control signal to a camera device holder where the camera device is mounted;
detecting, in response to sending the control signal, an alignment between the target position and the light source within the field-of-view; and
further capturing, using the camera device and in response to detecting the alignment, an additional image of the scene,
wherein the selected object appears in the additional image at the target position,
wherein the field-of-view of the camera device is changed, by the camera device holder in response to the control signal, in a direction opposite to the pixel position displacement,
wherein the alignment corresponds to an overlap between the light source and at least the second pixel position within the field-of-view, and
wherein the light source is attached to an object in the scene such that the object overlaps at least the second pixel position in the additional image.

6. The method of claim 5,
wherein the sequence of images and the additional image are part of a sequence of video frames in a video recording.

7. The method of claim 1, further comprising:

analyzing the sequence of images to determine the location of the light source in the at least one image and a movement of the light source across the sequence of images, wherein generating the control signal is further based on the movement.

8. A tracking controller for a camera device, comprising:

a computer processor; and memory storing instructions, when executed, causing the computer processor to:

capture a sequence of images of a scene, wherein the sequence of images is captured by a single optical sensor of the camera device;

detect, based on a pattern of local light change across the sequence of images captured by the single optical sensor, a light source in the scene;

compare, in response to detecting the light source, a location of the light source in at least one image of the sequence of images and a target position within the at least one image to generate a result; and generate, based on the result, a control signal for changing a field-of-view of a camera device such that the light source aligns with the target position within the field-of-view, wherein the light source is configured to produce an object-identifying code, wherein the pattern of local light change identifies at least a first pixel position in the at least one image as the location of the light source, wherein the target position corresponds to at least a second pixel position in the at least one image, and wherein the result comprises a pixel position displacement between at least the first pixel position of the light source and at least the second pixel position of the target position.

9. The system of claim 8, wherein the light source is at least one selected from a group consisting of a local light emitter attached to an object in the scene and a reflective region of the object emitting an object-reflected light in response to a remote light emitter separate from the object, and wherein the pattern of local light change across the sequence of images is produced by at least one selected from a group consisting of the local light emitter, the remote light emitter, and a geometric reflection pattern of the reflective region.

10. The system of claim 8, wherein the pattern of local light change comprises at least one selected from a group consisting of a light intensity change, a light wavelength change, a repetition rate of the light intensity change, and a repetition rate of the light wavelength change.

11. The system of claim 8, the instructions, when executed, further causing the computer processor to:

extract the object-identifying code from the pattern of local light change; and identify, from a plurality of light sources associated with a plurality of objects in the scene, the detected light source based on the extracted object-identifying code to select the object from the plurality of objects.

12. The system of claim 11, the instructions, when executed, further causing the computer processor to:

send the control signal to a camera device holder where the camera device is mounted;

detect, in response to sending the control signal, an alignment between the target position and the light source within the field-of-view; and further capture, using the camera device and in response to detecting the alignment, an additional image of the scene, wherein the selected object appears in the additional image at the target position, wherein the field-of-view of the camera device is changed, by the camera device holder in response to the control signal, in a direction opposite to the pixel position displacement, wherein the alignment corresponds to an overlap between the light source and at least the second pixel position within the field-of-view, and wherein the light source is attached to an object in the scene such that the object overlaps at least the second pixel position in the additional image.

13. The system of claim 12, wherein the sequence of images and the additional image are part of a sequence of video frames in a video recording.

14. The system of claim 8, the instructions, when executed, further causing the computer processor to:

analyze the sequence of images to determine the location of the light source in the at least one image and a movement of the light source across the sequence of images, wherein generating the control signal is further based on the movement.

15. A non-transitory computer readable medium storing instructions for object tracking, the instructions, when executed by a computer processor, comprising functionality for:

capturing a sequence of images of a scene, wherein the sequence of images is captured by a single optical sensor of a camera device;

detecting, based on a pattern of local light change across the sequence of images captured by the single optical sensor, a light source in the scene;

comparing, in response to detecting the light source, a location of the light source in at least one image of the sequence of images and a target position within the at least one image to generate a result; and generating, based on the result, a control signal for changing a field-of-view of a camera device such that the light source aligns with the target position within the field-of-view, wherein the light source is configured to produce an object-identifying code, wherein the pattern of local light change identifies at least a first pixel position in the at least one image as the location of the light source, wherein the target position corresponds to at least a second pixel position in the at least one image, and wherein the result comprises a pixel position displacement between at least the first pixel position of the light source and at least the second pixel position of the target position.

16. The non-transitory computer readable medium of claim 15, wherein the light source is at least one selected from a group consisting of a local light emitter attached to an object in the scene and a reflective region of the object emitting an object-reflected light in response to a remote light emitter separate from the object, and wherein the pattern of local light change across the sequence of images is produced by at least one selected from a group consisting of the local light emitter, the remote light emitter, and a geometric reflection pattern of the reflective region.

17. The non-transitory computer readable medium of claim 15,
wherein the pattern of local light change comprises at least one selected from a group consisting of a light intensity change, a light wavelength change, a repetition rate of the light intensity change, and a repetition rate of the light wavelength change.

18. The non-transitory computer readable medium of claim 15, the instructions, when executed by the computer processor, further comprising functionality for:
extracting the object-identifying code from the pattern of local light change; and
identifying, from a plurality of light sources associated with a plurality of objects in the scene, the detected light source based on the extracted object-identifying code to select the object from the plurality of objects.

19. The non-transitory computer readable medium of claim 18, the instructions, when executed by the computer processor, further comprising functionality for:
sending the control signal to a camera device holder where the camera device is mounted;
detecting, in response to sending the control signal, an alignment between the target position and the light source within the field-of-view; and
further capturing, using the camera device and in response to detecting the alignment, an additional image of the scene,
wherein the selected object appears in the additional image at the target position,
wherein the field-of-view of the camera device is changed, by the camera device holder in response to the control signal, in a direction opposite to the pixel position displacement,
wherein the alignment corresponds to an overlap between the light source and at least the second pixel position within the field-of-view, and
wherein the light source is attached to an object in the scene such that the object overlaps at least the second pixel position in the additional image.

20. The non-transitory computer readable medium of claim 15, the instructions, when executed by the computer processor, further comprising functionality for:
analyzing the sequence of images to determine the location of the light source in the at least one image and a movement of the light source across the sequence of images,
wherein generating the control signal is further based on the movement.

* * * * *